June 8, 1926.  1,587,967
A. W. LIMONT
WASTE FITTING FOR LAVATORIES AND METHOD OF MAKING THE SAME
Filed August 14, 1924  2 Sheets-Sheet 1

INVENTOR.
Alexander W. Limont
BY
Chamberlain + Newman
ATTORNEYS

June 8, 1926.
A. W. LIMONT
1,587,967
WASTE FITTING FOR LAVATORIES AND METHOD OF MAKING THE SAME
Filed August 14, 1924    2 Sheets-Sheet 2
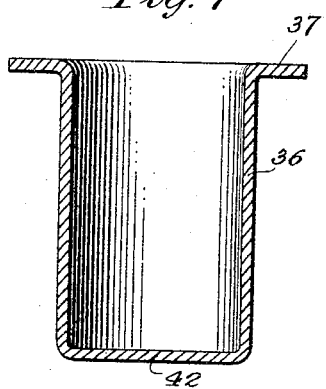
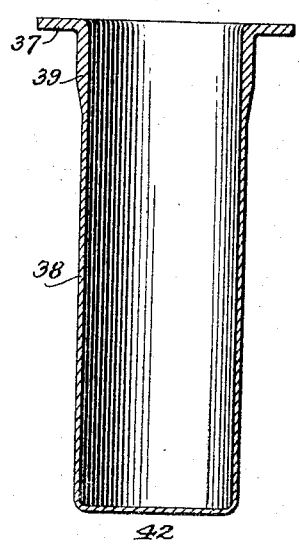
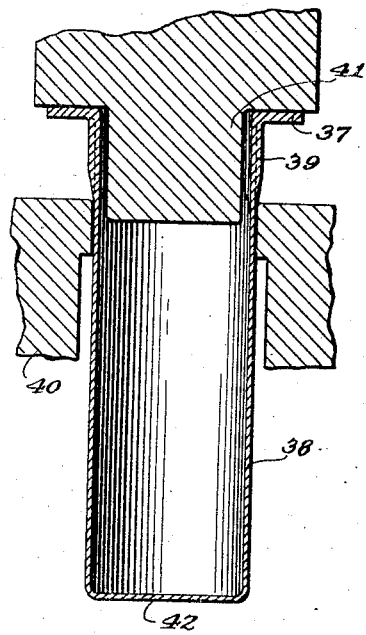
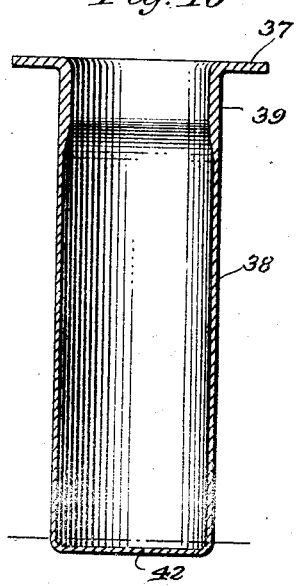
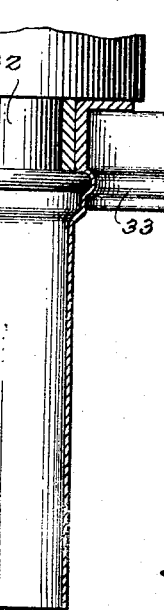
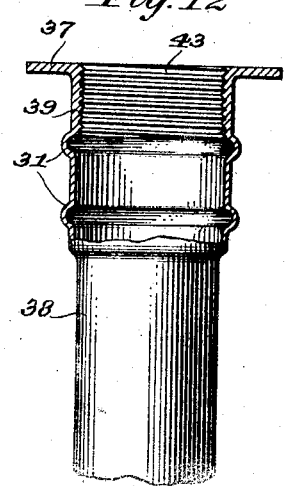
INVENTOR.
Alexander W. Limont
BY
Chamberlain + Newman
ATTORNEYS Patented June 8, 1926.

1,587,967

UNITED STATES PATENT OFFICE.

ALEXANDER W. LIMONT, OF BRIDGEPORT, CONNECTICUT.

WASTE FITTING FOR LAVATORIES AND METHOD OF MAKING THE SAME.

Application filed August 14, 1924. Serial No. 731,981.

The present invention relates to waste fittings, and an improved method of making the same, for use with the waste pipes or traps of lavatories, sinks, basins, or the like, and has for an object to provide a novel method by which such fittings may be drawn or formed from wrought metal in a simple and economical manner to produce one-piece fittings, as distinguished from such fittings heretofore in use, and which consisted of a drawn shell and an internally threaded flanged collar inserted and fastened in one end thereof.

This flanged collar, as heretofore used, is made with a wall section thick enough to have a standard size thread formed internally, and a flange of a thickness sufficient to make a watertight joint by means of a ring of packing inserted between it and the body of the basin, or other vessel, and drawn up tight by screwing said collar part onto a plug connection projecting out of said vessel. While this method has heretofore been used almost universally, a great amount of trouble and damage has been caused by the loosening and separating of the collar from the body shell, due to excessive strain in making the joint tight, and quite frequently due to careless and faulty workmanship in fastening together the collar and shell.

The present method is designed to overcome the disadvantages of these previously known fittings, and at the same time maintain the same standard weight and dimensions, and to this end it is proposed to form the fitting from a single piece of wrought metal having a portion of the wall relatively thick to enable threads to be cut therein, a relatively thick flange for strength in securing the fitting in a vessel, and a relatively thin main shell portion for lightness.

With the above and other objects in view, the several steps of my improved method are shown in the accompanying drawings, and the same will be hereinafter more fully described with reference thereto, and the invention will be finally pointed out in the claims.

In the drawings:

Fig. 7 is a vertical sectional view showing a flanged blank shell, as used in a modification of the method;

Fig. 8 is a vertical sectional view showing the same after the step of drawing the relatively thin portion of the shell;

Fig. 9 is a vertical sectional view showing the shell of Fig. 8 in position in a forming die adapted to perform the step of rendering the outside diameter uniform;

Fig. 10 is a vertical sectional view of the shell, as formed by the dies shown in Fig. 9;

Fig. 11 is a vertical sectional view of a further step in which an annular groove is formed in the wall; and Fig. 12 is a view partly in section showing the fitting after the final step of threading, and with a modified groove structure.

Similar reference characters indicate corresponding parts throughout the several figures of the drawings.

In carrying out my improved method a tubular cup-shaped blank or shell 20 is drawn from wrought metal, its wall adjacent the closed end being relatively thick, as at 21, for a given distance, while the remainder of the shell is relatively thin, the outside diameter being uniform for the entire length.

Figure 1:
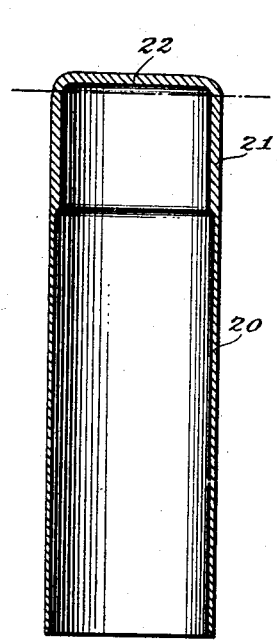
Fig. 1 is a vertical sectional view of a blank shell after the first operation thereon of producing relatively thick wall portions.

The closed end 22 of the shell is next cut off along the line indicated in Fig. 1, and the blank is ready for shaping in suitable shaping dies.

Figure 2:
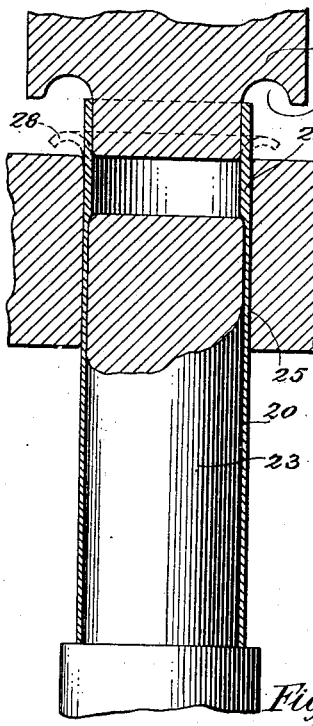
Figs. 2 and 3 are vertical sectional views showing the formation of the flanged end.
Figure 3:
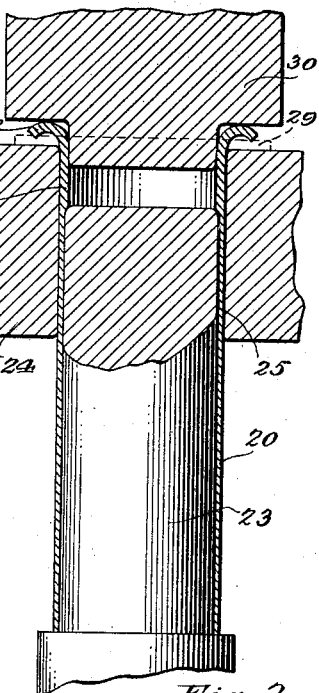

The blank is placed in a holding die comprising an inner mandrel 23 extending into the shell to the shoulder formed by the upper thickened portion, and a supporting member 24 having a cylindrical opening 25 therein engaging the outer side of the shell, the upper end of the shell projecting above said member 24 to be formed into a lateral flange. A shaping die 26 having a rounded annular forming channel 27 is first engaged with the blank by a suitable pressure applying means, and imparts a preliminary flanging shape 28 thereto, as indicated by dotted lines in Fig. 2, and full lines in Fig. 3.

The next step consists in completing the flanging operation to form a flat lateral flange 29 by means of a die 30, having a right angular shouldered shaping portion, which cooperates with the upper surface of the member 24 to produce said flange.

Figure 4:
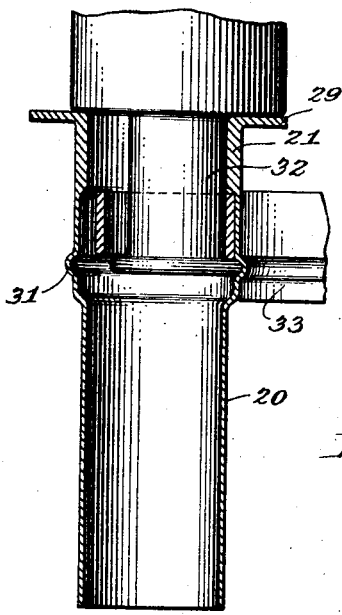
Fig. 4 is a vertical sectional view of a further step in which an annular groove is formed in the wall.
Figures 5, 6:
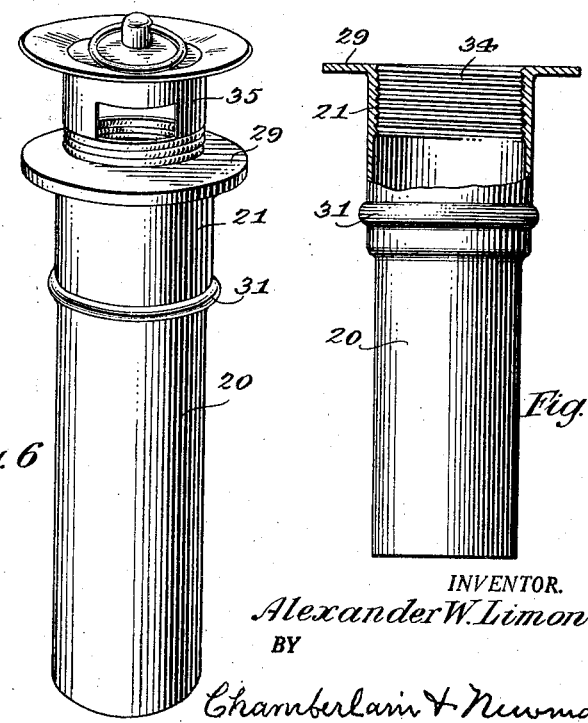
Fig. 5 is a view partly in section and showing the fitting after the final step of threading.
Fig. 6 is a perspective view showing the fitting with a pull out plug screwed therein.

The thin skirt portion of the shell may be given any desired dimension or shape, and as shown in Fig. 4 the same is grooved, as at 31, by suitable grooving rollers 32 and 33, in spaced relation to the thickened portion 21, and the skirt portion below said groove is drawn to a relatively smaller diameter.

The fitting is completed by tapping standard threads 34 in the portion 21, which is of sufficient thickness to permit relatively deep cuts therein, without weakening. In assembling in a basin, or the like, the usual type of threaded flanged pull out plug 35 is screwed into the flanged threaded end of the fitting.

In Figs. 7 to 12 there is illustrated a modification of the method, in which a blank shell 36 having relatively thick walls is provided at its open end with a lateral flange 37, produced by suitable dies. At a point in spaced relation to the flange the shell is drawn to produce a relatively thin walled elongated skirt portion 38 and a relatively thick walled portion 39 adjacent the flange, the interior diameter being uniform throughout the length.

The shell is then subjected to the action of suitable dies comprising an apertured die member 40, the aperture of which is of a diameter equal to that of the outer diameter of the thin skirt portion, and a shouldered punch die member 41 adapted to engage the interior of the shell, and of a diameter less than that of the interior of the shell equal to the difference in thickness between the thickened portion 39 and the portion 38. Other means, as rollers, may be employed, if desired.

By means of suitable pressure applying means the dies are brought together, drawing the upper flanged end and the thickened portion 39 inwardly, so that the thickness of the portion 39 extends inwardly with respect to the inner surface of the thin portion 38. The closed end 42 is thereupon cut off along the line indicated in Fig. 10.

From this point the steps are the same as in the first embodiment of the method, the shell being subjected to the action of the grooving rollers 32 and 33, if desired, and the portion 38 drawn to a smaller diameter. The thickened portion 39 is tapped to produce an internal thread 43. The rollers 32 and 33, acting adjacent the thickened portion, also function to smooth out any inequalities or roughness that might be produced by the dies or other means for producing the thickened portion.

The grooves may be of any desired form and placement, Fig. 4 showing a single groove in spaced relation to the thickened portion, while Fig. 11 shows a single groove adjacent the thickened portion, and Fig. 12 shows two spaced grooves, one of which is adjacent the thickened portion.

With my improved method a fitting is produced having all of the functional advantages of fittings heretofore in use, and with advantages of strength, simplicity, economy, and freedom from damage and the necessity for frequent repairs, not found in such previous devices.

I have illustrated and described preferred and satisfactory embodiments of my invention, but it will be obvious that changes may be made therein, within the spirit and scope thereof, as defined in the appended claims.

Having thus described my invention, what I claim and desire to secure by Letters Patent is:

1. The herein described method of producing waste fittings from hollow drawn metal, which consists in drawing the metal to produce a relatively thick end portion and a relatively thin skirt portion in continuation of said relatively thick portion, bending said thick portion at one end to produce a relatively thick laterally extending flange and a relatively thick cylindrical wall portion adjacent said flange, and cutting internal threads in said relatively thick cylindrical portion.

2. The herein described method of producing waste fittings from hollow drawn metal, which consists in drawing the metal to produce a relatively thick cylindrical end portion, bending said end portion at one end to produce a relatively thick laterally extending flange, and cutting internal threads in said cylindrical end portion.

3. The herein described method of producing waste fittings from hollow drawn metal, which consists in drawing the metal to produce a relatively thick end portion and a relatively thin skirt portion in continuation of said relatively thick portion, bending said thick portion at one end to produce a relatively thick laterally extending flange and a relatively thick cylindrical wall portion adjacent said flange, drawing said relatively thin portion to a relatively reduced outside diameter, and cutting internal threads in said relatively thick cylindrical portion.

4. The herein described method of producing waste fittings from hollow drawn metal, which consists in drawing the metal to produce a relatively thick end portion and a relatively thin skirt portion in continuation of said relatively thick portion, bending said thick portion at one end to produce a relatively thick laterally extending flange and a relatively thick cylindrical wall portion adjacent said flange, spinning an annular groove in said relatively thin skirt portion, and cutting internal threads in said relatively thick cylindrical portion.

5. The herein described method of producing waste fittings from hollow drawn metal, which consists in drawing the metal to produce a relatively thick end portion and a relatively thin skirt portion in continuation of said relatively thick portion, bending said thick end portion at one end to produce a relatively thick laterally extending flange and a relatively thick cylindrical wall portion adjacent said flange, spinning an annular groove in said relatively thin skirt portion, drawing said relatively thin portion to a relatively reduced diameter below said groove, and cutting internal threads in said relatively thick cylindrical portion.

6. The herein described method of producing waste fittings from hollow drawn metal, which consists in drawing the metal to produce a relatively thick end portion and a relatively thin skirt portion in continuation of said relatively thick portion of an outside diameter greater than the inside diameter of said relatively thick portion, bending said thick portion at one end to produce a relatively thick laterally extending flange and a relatively thick cylindrical wall portion adjacent said flange, and cutting internal threads in said relatively thick cylindrical portion.

7. The herein described method of producing waste fittings from hollow drawn metal, which consists in drawing the metal to produce a relatively thick end portion and a relatively thin skirt portion in continuation of said relatively thick portion of an inside diameter greater than the inside diameter of said relatively thick portion, bending said thick portion at one end to produce a relatively thick laterally extending flange and a relatively thick cylindrical wall portion adjacent said flange, drawing said relatively thin portion to a relatively reduced outside diameter, and cutting internal threads in said relatively thick cylindrical portion.

8. The herein described method of producing waste fittings from hollow drawn metal, which consists in drawing a cylindrical cup-shaped shell closed at one end, cutting off said closed end to produce a tubular shell open at both ends, drawing the metal to produce a relatively thick end portion and a relatively thin skirt portion in continuation of said relatively thick portion, bending said thick portion at one end to produce a relatively thick laterally extending flange and a relatively thick cylindrical wall portion adjacent said flange, and cutting internal threads in said relatively thick cylindrical portion.

9. A waste fitting formed of hollow drawn metal, comprising a cylindrical shell having an end portion of relatively thick cross section, a skirt portion of relatively thin cross section in integral continuation of said thick portion, a flange bent laterally at the end of said thick portion, said thick portion being threaded interiorly.

10. A waste fitting formed of hollow drawn metal, comprising a cylindrical shell having an end portion of relatively thick cross section, a skirt portion of relatively thin cross section in integral continuation of said thick portion, the inner diameter of said thick portion being less than that of the thin portion immediately adjacent thereto, a flange bent laterally at the end of said thick portion, said thick portion being threaded interiorly.

11. A waste fitting formed of hollow drawn metal, comprising a cylindrical shell having an end portion of relatively thick cross section, a skirt portion of relatively thin cross section in integral continuation of said thick portion, the inner diameter of said thick portion being less than that of the thin portion immediately adjacent thereto, a flange bent laterally at the end of said thick portion, said thick portion being threaded interiorly, and a shoulder integrally formed in said thin portion intermediate its ends.

Signed at Bridgeport, in the county of Fairfield and State of Connecticut this 12th day of August, A. D., 1924.

ALEXANDER W. LIMONT.